ized, phenolic oligomers, in the presence of
United States Patent [19]
Lamartine et al.

[11] Patent Number: 5,852,064
[45] Date of Patent: Dec. 22, 1998

[54] FOAMED AND CROSS-LINKED PHENOLIC RESIN AND METHOD FOR MAKING SAME

[75] Inventors: Roger Lamartine, Villeurbanne, France; Philippe Choquard, Cologny, Switzerland

[73] Assignee: Transdiffusia S.A., Switzerland

[21] Appl. No.: 952,266

[22] PCT Filed: May 17, 1996

[86] PCT No.: PCT/CH96/00192

§ 371 Date: Nov. 14, 1997

§ 102(e) Date: Nov. 14, 1997

[87] PCT Pub. No.: WO96/36659

PCT Pub. Date: Nov. 21, 1996

[30] Foreign Application Priority Data

May 18, 1995 [CH] Switzerland ............ 1466/95

[51] Int. Cl.$^6$ ...................................................... C08J 9/14
[52] U.S. Cl. ................ 521/88; 521/89; 521/90; 521/117; 521/121; 521/181
[58] Field of Search ................ 521/88, 89, 90, 521/117, 121, 181

[56] References Cited

U.S. PATENT DOCUMENTS

| | | | |
|---|---|---|---|
| 4,207,401 | 6/1980 | Dahms | 521/181 |
| 4,219,623 | 8/1980 | Sudan | 521/181 |
| 4,303,758 | 12/1981 | Gusmer | 521/181 |

*Primary Examiner*—Morton Foelak
*Attorney, Agent, or Firm*—Kane, Dalsimer, Sullivan, Kurucz, Levy, Eisele and Richard, LLP

[57] ABSTRACT

A phenolic foam having exceptional absorption capacities for pollutants such as hydrocarbons and other substances is described. The foam is hydrophobic and is capable of absorbing such substances in amounts up to 72 times its own weight. It is the reaction product of a resol and a cross-linking agent made of linear and/or cyclic, partially or completely sulphonated, phenolic oligomers, in the presence a surfactant and a swelling agent, and, optionally, of a coloring agent and stabilizers. A method for making the foam, an installation for implementing the method and a use of said foam are also described.

12 Claims, 3 Drawing Sheets

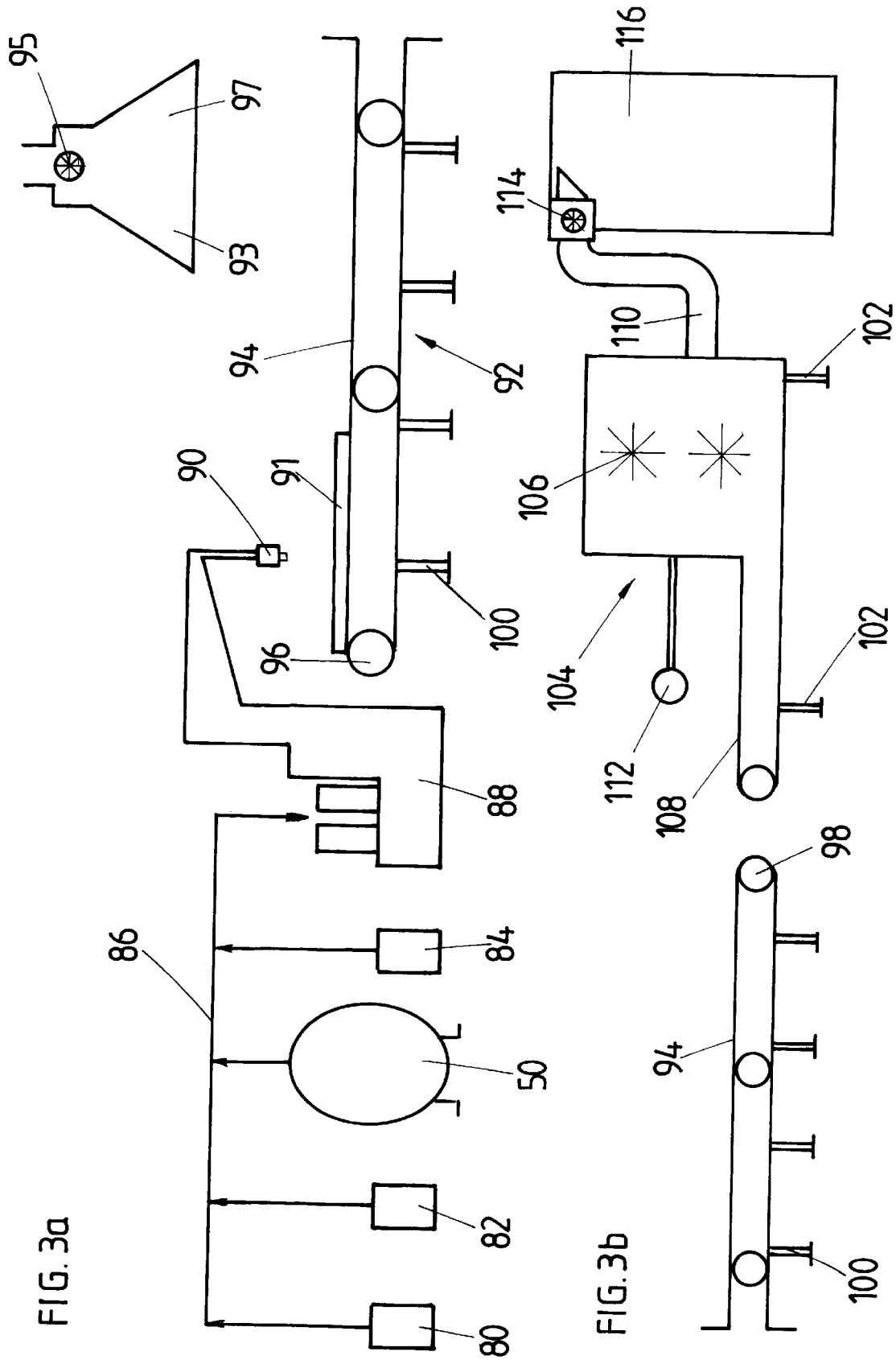

FOAMED AND CROSS-LINKED PHENOLIC RESIN AND METHOD FOR MAKING SAME

The present invention belongs to the field of cross-linked phenolic resins. In particular, it is related to a new cross-linked phenolic resin in the form of a foam, and to a process for the preparation of this foamed cross-linked phenolic resin having special surface active properties. The invention is further related to an installation for the manufacture of the phenolic foam.

Accidental pollution of water provoked by hydrocarbons on the sea and on land and touching the sea, the coasts and inshore waters have become more and more frequent and constitute a very serious problem to the environment. The means available for confining the pollution and for collecting the spilt hydrocarbons are limited. In spite of all search efforts that have been made, it has not been possible to find a means simple to apply, having a safe and reliable action and being furthermore inexpensive and easy to collect. For example, it has been tried to render the spilt hydrocarbons wettable by spreading surface active agents onto the surface of polluted water in order to obtain an aqueous dispersion, but this method brings about risks of toxicity and does not eliminate the hydrocarbons themselves. Undoubtedly, the best method comprises the removal of the hydrocarbons from the water by absorption or adsorption by means of solid bodies that are much easier to separate from the contaminated surface and to be removed therefrom.

It has therefore been suggested to use, for example, the following absorbing materials: pre-treated minerals such as perlite and bentonite; fibrous materials such as cellulosic fibers, glass fibers and peat; synthetic materials, e.g. polyurethane, polyethylene, polypropylene, epoxy resins, polyesters, and also urea formaldehyde resins. Among these materials, hydrophobic products should be preferred since they have a better absorption power; for example, microporous polypropylene has an absorption power that is 23 times its weight whereas the peat, a hydrophilic matter, absorbs only 8.3 times its weight of hydrocarbons.

According to French patent No. 2,073,083, one has already suggested to use a phenolic foam for the fixation of oils, fats, petrol (gasoline) and similar products spilt on the surface of solids or liquids, for example on water. However, this document fails to mention data regarding the composition of the foam excepted that it is a foamed phenolic or formol-phenolic resin, and regarding the properties of the foam. As it will be shown below, the phenolic foams known until now are not very effective for the absorption of fatty materials in view of their hydrophilicity.

Therefore, there is a strong need of a new, more effective absorbing material which can be used to combat the pollution of the environment by hydrocarbons.

The object of the present invention is therefore to provide a new absorbing, lipophilic material which can be used especially as an antipollution material.

This objective is attained by the phenolic foam according to this invention that is defined in the first independent patent claim. The second independent patent claim is directed to a manufacturing process of the new foam, and the third independent patent claim to an installation for carrying out the process. The fourth independent patent claim finally defines a use of the foam. The subject of the dependent patent claims are special embodiments of the subject of their superordinated independent claims.

In order to obtain the foam of the invention, it is necessary to combine in a new and unexpected manner at least the following components:

a reactive phenolic resin, preferably of the resol type;
a surface active agent, preferably of the polyetherpolysiloxane type or a polyether, modified by a dimethylpolysiloxane copolymer;
a cross-linking agent selected from sulfonated phenolic oligomers; and
a blowing or foaming agent.

Other component may additionally be present, preferably one or more coloring agents and stabilizers.

In the following, these components will be described in more detail.

The resol

It is known to manufacture phenol-formol oligomers and to condense same in the presence of acidic catalysts. These oligomers, called resols, are prepared from optionally substituted phenols and formaldehyde in aqueous solution, using specially selected stoichiometric ratios and a basic catalyst. The resols show a tendency to a slow polycondensation; this polycondensation can be accelerated by an acidic catalyst, generally sulfuric acid which however remains as such within the phenolic plastic obtained after the polycondensation of the resol.

It has already become known to manufacture phenolic foams by a polycondensation of still liquid phenolic resins in the presence of a blowing agent, this polycondensation being effected by the action of an acidic catalyst that does not take part as a cross-linking agent in the chemical reactions. Such foams are useful as heat and noise insulating materials. However, the disadvantages of these foams are also based upon the presence of a strong free acid which cannot be removed by washing since it is imprisoned within the macromolecules of the phenolic plastic. Furthermore, these foams are hydrophilic.

The surface active agent

The surface active agent is specially selected for producing the cellular structure of the hydrophobic foam to be manufactured, on one hand, and for imparting the hydrophobicity to the foam, on the other hand. It is generally introduced into the resol during the manufacture of the resin. The non-ionic and amphoteric surface active agents do not modify the shelf live of the resols and are thus preferably used.

The surface active agents which will be used in the frame of the present invention should be water soluble and have an HLB value (hydrophilic lipophilic balance) of $\geq 10$, and they should be stable in the presence of strong acids constituted by the cross-linking agent (sulfonic acids).

The use of ethylene and propylene oxide copolymers and in particular of different organo-silicon compounds, of polydimethyl siloxanes, and of polysiloxane polyether copolymers and polysiloxane polyglycols is preferred. As examples, silicone glycol copolymers and polysiloxane polyether copolymers are cited. However, these classes of surface active agents are examples only.

The cross-linking agent

According to the present invention, it has been found that certain substances having an acidic character can advantageously replace the acid catalysts such as sulfuric acid that are at present used for the condensation of resols. It has been found that these substances which are proposed by the invention for the replacement of the acid catalyst are constituted by partially or totally sulfonated phenolic oligomers. These substances are exactly of the same nature as the resols with the exception of their —$SO_3H$ substituents, and they are chemically combined with the resols and form the bridges between the resol molecules; they are thus not physically imprisoned within the phenolic plastic network under formation but are incorporated into this network as a chemical constituent thereof.

The invention uses the new cross-linking agent in the form of partially or completely sulfonated linear phenolic oligomers, of sulfonated phenol, of partially or completely sulfonated cyclic phenolic oligomers, or of mixtures thereof, and each mixture may further contain simple sulfonated phenol. The diversity of these cross-linking agents confers to the phenolic foam according to this invention its special properties, namely one may adjust the final properties of the foam to be manufactured by an adequate selection of the cross-linking agent.

Sulfonated cyclic phenolic oligomers are in part already known; however, they have never been proposed yet as an additive to resols for their polycondensation. Sulfonated cyclic phenolic oligomers have for example been disclosed in the article "Synthesis and acid-base properties of calix[4], calix[6] and calix[8]arene p-sulfonic acids" by J. P. Scharff, M. Mahjoubi and R. Perrin, *New J. Chem.* 1991, 15, 883–887 but their use according to the invention, namely as a cross-linking agent, has not been suggested nor disclosed.

The blowing agent

This product is incorporated into the foam forming mass is in order to form the pores. The blowing agents should be
   compatible with the surface active agents,
   uninflammable, having no flash point,
   a low boiling point, i.e. <35° C.,
   a low heat of vaporization, namely <300 kJ/kg.

They may be selected from the families of hydrocarbons HC, the chlorofluorocarbons CFC, the hydrochlorofluorocarbons HCFC or the hydrofluoroalkanes HFA, and from the mixtures of substances selected from these classes. One example is the HCFC 141.

Additives

Certain additives may be added to the starting formulation of the foam. In particular, coloring agents are to be mentioned but other additives are also contemplated, namely stabilizers, for example antioxidants and anti-UV agents. The coloring agent serves to give the foam an aspect distinguishing it from other product and for following the absorption process during its use.

Depending on the applications and uses of the foams of the invention, coloring agents are necessary. Azoic coloring agents or dyestuffs are to be mentioned, preferably phenolic azo dyes.

Sulfonated phenolic azo dyes have the advantage that they can immediately be used in the cross-linking system; they are stable in acidic mediums, show antioxidant properties, and supply a supplementary acidity to the cross-linking system.

The dyestuffs that are generally introduced in an amount of from 0.1 to 1% by weight of the cross-linking agent are monomers such as those of the formula

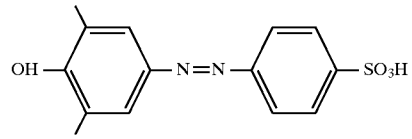

or azoic cyclic oligomers of the family of coloring calixarenes.

The preferred manufacturing process for the absorbing foam is generally carried out in the following manner:

1. Preparation of the resol

The preparation is generally carried out according to the already known techniques: The components, namely the phenol, the formaldehyde source and the alkaline catalyst, are charged into a reactor in the desired ratios, the mixture is reacted under stirring and under precise and controlled temperature conditions, the reaction mixture is then allowed to ripen during a predetermined time duration, and the resol is finally recovered for subsequent use. The resol component contains preferably the surface active agent which is added to the resol after or during the ripening step.

2. Preparation of the cross-linking agent

The cross-linking agent is prepared from optionally substituted phenol, an acidic catalyst, and a formaldehyde source, the oligomers thus obtained are then more or less sulfonated, and the cross-linking agent is then recovered and stored for a subsequent use. If it is desired that the cross-linking agent contains sulfonated cyclic phenolic oligomers, it is preferred that such oligomers not yet sulfonated are separately prepared, that they are sulfonated, and that these are added to the above reaction mixtures prior to their storage Foam The manufacture of the foam uses the different components described above. The process is designed as a continuous one. The resol (prepared according to the technique described above), the cross-linking agent (see also the above preparation step) and the blowing agent are metered in the predetermined ratios into a mixer device. The mixer produces an intimate blend of the introduced components, and the expansion is automatically initiated since the cross-linking reaction of the resol is exothermic, resulting in a temperature increase of the mixture beyond the boiling or decomposition temperature of the blowing agent, respectively, for example 80° C.; this temperature depends of course on the type of the blowing agent and the selected reagents. In this manner, the exothermicity of the cross-linking reaction is used to bring about the evaporation of the blowing agent.

The cross-linking of the resol under expansion and the solidification of the formed foam are accomplished on a casting belt continuously running under a delivery head of the mixer device. The reaction mixture is thus poured on the running belt which may be temperature controlled, in the form of a pouring that expands during a few seconds and forms a solid foam string at the end of the running belt. This string is then shredded into pieces of different desired size and shape. For example, according to the mechanical speed of the selected shredder device, it is possible to produce foam pieces of about 5 to 5 cm, useful for combating pollution, or flakes or pieces of any other size if desired.

The installation for the manufacture of the foam according to the invention comprises the following units:
   a resol production unit, comprising a reactor equipped with a stirrer, a thermostated double shell, and the recipients and tanks necessary for the starting materials: phenol, sodium hydroxide solution, paraformaldehyde, and the conventional metering and transportation devices. This unit further comprises ripening reactors for carrying out the final reaction, these ripening devices being equipped with a temperature control, and a storage tank;
   a unit for the production of the sulfonated cross-linking agent, comprising, for each constituent of the mixture that forms the cross-linking agent, at least one reactor equipped with a stirrer, a thermostated double shell, and the recipients and tanks necessary for the starting materials: phenol, sulfuric acid, formaline, water and optionally other additives such as cyclic phenolic oligomers. This unit further comprises mixing tanks for blending the different constituents of the cross-linking agent as well as storage tanks and the conventional auxiliary devices;

a foam production unit, comprising supply pumps, a mixer device equipped with supply tanks for the resin that contains the surface active agent, for the cross-linking agent and the blowing agent as well as the weight or volume metering devices, and a casting belt or similar;

a shredder and storing unit; and optionally, a conditioning and/or packaging unit.

The invention will now be described in more detail in making reference to the drawing showing an example of the installation, and in giving examples of the manufacture itself.

The attached drawing shows the different units described above, namely:

FIG. 3A is a schematical side view of a foam production unit; and

FIG. 3B is the continuation to the right of the unit according to FIG. 3A that also shows a shredder unit for the foam containing a storage device.

The Figures could be drafted as a schema since the different elements of the units are typically apparatuses and devices that are known per se; furthermore, auxiliary devices and members such as thermometers, pumps, elements and members for regulation and control, supply devices for electric current and other energies are not shown either since they are well known to the one skilled in the art.

Figure 1:
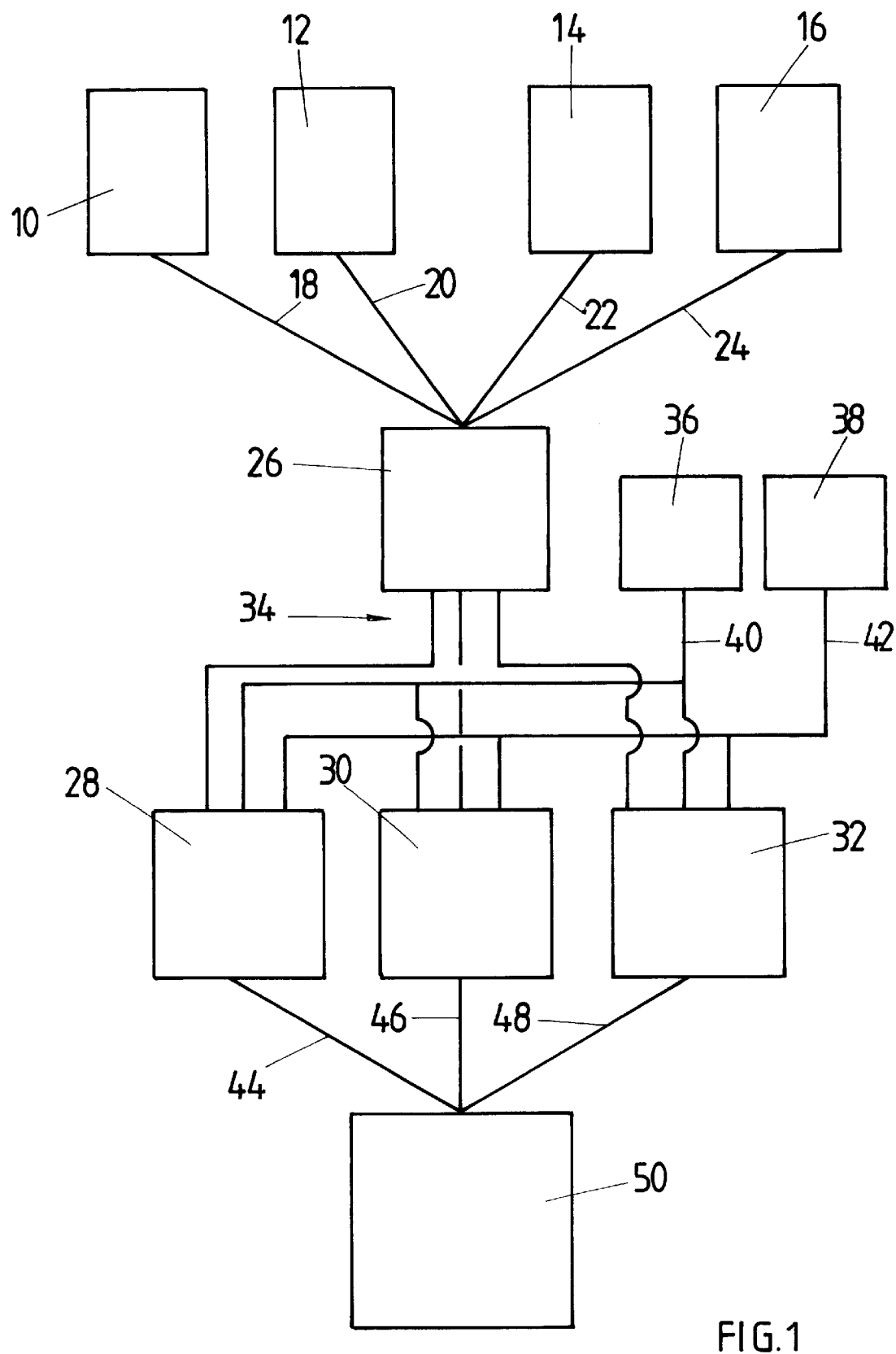
FIG. 1 is a schematical representation of a resol manufacturing unit.

FIG. 1 shows schematically the resol manufacturing unit. The materials and substances that are to be reacted are stored in tanks 10 to 16. Tank 10 contains phenol, typically containing about 10% by weight of water in order to keep it easier in the liquid state; tank 10 is equipped with a thermal insulation, a heat exchanger, and a constant feed motor pump (these elements are not shown). Tank 12 is to contain an aqueous solution of caustic soda (NaOH); it is made of special steel. Tank 14 simply contains water, and tank 16 is a silo for the paraformaldehyde comprising a delivery device, an installation for maintaining its content under nitrogen, a vibrating device on the tank and a delivery screw with a delivery speed control.

The four storage tanks 10 to 16 are connected by ducts 18, 20, 22 and 24, respectively, to reactor 26 which is equipped with a stirrer, a double shell for receiving a temperature controlled fluid, and a thermometric sensor.

The unity according to FIG. 1 additionally comprises at least one reactor for completing the principal reaction; these reactor are called "ripeners"; in FIG. 1, three ripeners 28, 30 and 32 are shown that are connected by conduits 34 to the discharge outlet of the reactor 26. Furthermore, it is possible to add a stabilizer, stored in tank 36, and also, if this is desired already in this stage of the process, the surface active agent from tank 38 into the ripeners. The conduits 40 and 42 connect tanks 36 and 38, respectively, to the ripeners 28, 30 and 32. The ripeners are equipped with a temperature controlled double shell and a stirrer. The discharge outlet of each ripener is connected by a duct 44, 46 and 48, respectively, to a large storage tank 50 for the resol.

Figure 2:
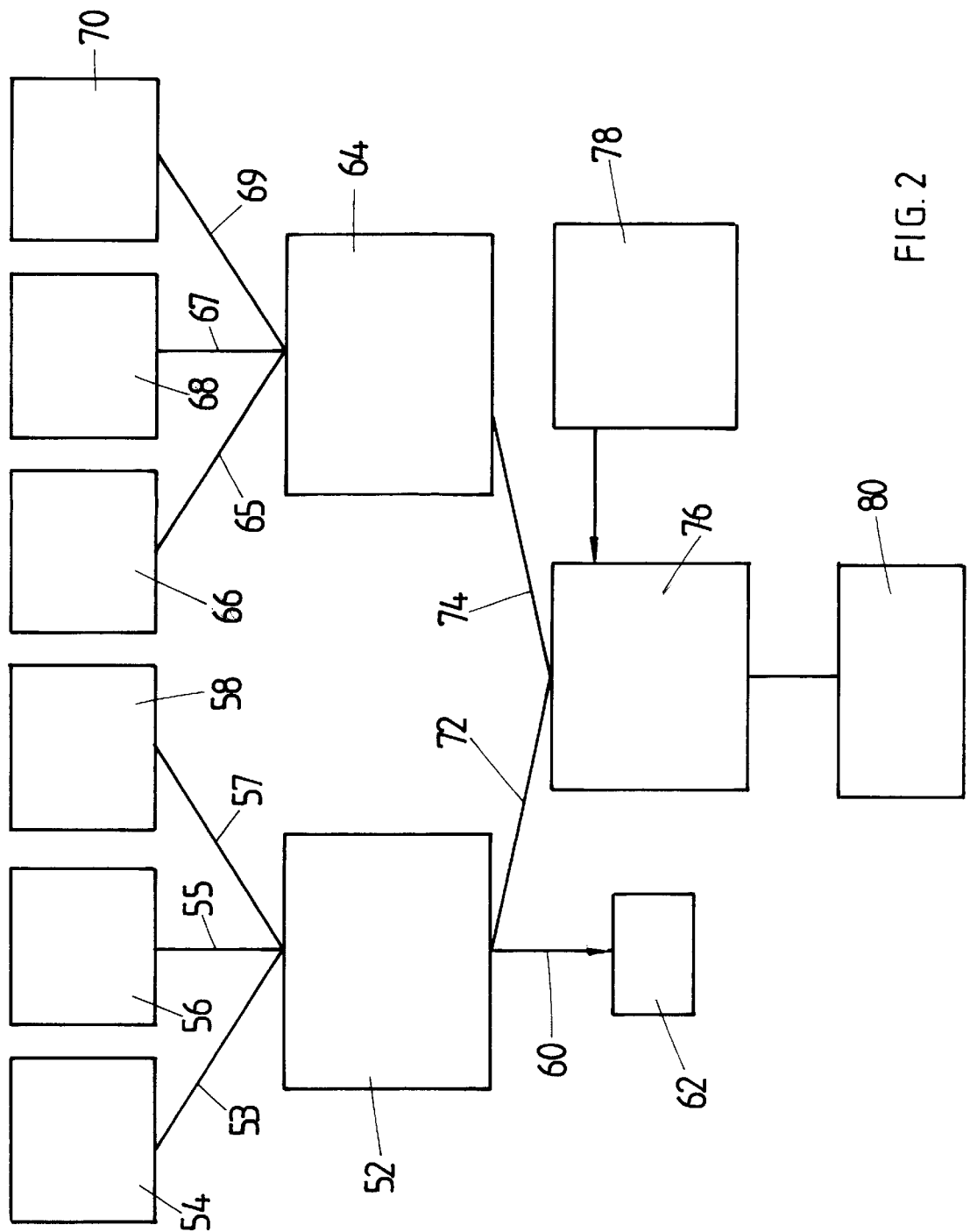
FIG. 2 is a schematical representation of a manufacturing unit for the cross-linking agent comprising sulfonation.

FIG. 2 shows a principal flowsheet of the manufacture of the linear and cyclic sulfonated phenolic monomeric and oligomeric cross-linking agents as well as of sulfonated phenol. A Grignard type reactor 52 has a capacity of 1250 liters; it is constructed from stainless steel with a double shell and with an insulation. This reactor 52 comprises also a stirrer, an ascending condenser and a thermometric sensor. Reactor 52 is connected by conduits 53, 55 and 57, respectively, to a tank 54 that contains phenol, a tank 56 containing formaline (an aqueous formaldehyde solution), and a tank 58 containing sulfuric acid. A conduit 60 permits to remove condensed water during the reaction and to supply it to a storage vessel 62.

A second reactor 64, identical with reactor 52, is provided for the preparation of sulfonated phenol. It is connected via ducts 65, 67 and 69, respectively, to a phenol tank 66, a sulfuric acid tank 68, and a water tank 70.

Conduits 72 and 74 lead from reactors 52 and 64, respectively, to a ripening and mixing vessel 76 of the type already described in connection with FIG. 1. The mixing ratio of the products discharged from reactors 52 and 64 can be adjusted by adjusting the amounts passing through conduits 72 and 74. A tank 78 contains sulfonated cyclic phenolic oligomers, and it is possible to transfer, if desired, these products into the ripener 76. The cross-linking mixture is then emptied into the storage tank 80.

FIGS. 3A and 3B schematically show a flowsheet of the manufacturing of the foam starting from the components mentioned above. The cross-linking agent, the blowing agent, the resol that contains already the surface active agent, and a rinsing solvent are stored in storage tanks 80, 82, 50 and 84, respectively, and the desired amounts of each component are transferred, using not shown metering devices, from the tanks 80, 82 and 50, through several ducts 86 connected to the feed inlet of the mixer 88. The components are intimately blended in this mixer 88, and the obtained blend is transported into the casting head 90 disposed over a charging tray 91 under which an endless moving belt 94 is running; this belt is returned by inverting cylinders 96, 98.

The moving belt 94 is mounted on feet 100. It has for example a length of 15 m and a width of 80 cm, and it is driven by a variable speed motor (not shown). An extractor 93 for evacuating the gases which are exhausted by the poured mass emerging from the head 90 and having the form of a string on the moving belt, is mounted above the moving belt 94; the extractor comprises a hood 97 and a fan 95 that draws in the reaction gases and send same to an air purification installation (not shown).

At the end of the moving belt, namely above the inverting cylinder 98, the string of the foamed mass is transferred onto another moving belt 108 that is part of a shredder device 104, mounted on feet 102. The foam is shredded when passing between the bucket wheels 106 which are driven in reverse direction by a motor that is not shown. The foam flakes produced by shredding are carried away, suspended in air, by a fan 114, and they settle within a storage and conditioning chamber 116.

The operational mode of the process according to the invention will further be illustrated in more detail by some examples of embodiments. However, the invention will not be limited by these examples.

EXAMPLE 1

A) Resol preparation 862.5 kg of phenol, containing small amounts of water, and 20.5 kg of an aqueous solution of NaOH are charged into reactor 26 (FIG. 1). 367 kg of paraformaldehyde are gradually introduced into this mixture within 10 hours. The temperature is controlled to a value between 40° and 50° C. After the end of this introduction, stirring is continued for at least 10 hours at the indicated temperature. The resol thus obtained is transferred by gravity into the ripeners 28, 30 and 32. The resol is allowed to cool to room temperature, stirring is continued for another 24 hours, and the required amount of surface active agent and, optionally, of antioxidation and anti-UV stabilizers is added. Finally, the resol is transferred into the storage tank 50.

B) Preparation of a cross-linking agent a) 220 kg of phenol are charged into reactor 52 (FIG. 2) at a temperature comprised between 40° C. and 50° C. 10 liters of sulfuric acid are slowly added under stirring, and then 45 liters of formaline are gradually introduced under stirring. Stirring is further maintained for 1 hour, and after abandoning during several hours, the aqueous layer that has formed is removed by decantation. 70 liters of sulfuric acid are then added slowly and under stirring; this addition is accompanied by an increase of the temperature. Stirring is continued for 12 hours, and the mixture of sulfonated linear phenolic oligomers that has been obtained is transferred into the ripener-mixer 76.

b) 55 kg of phenol are charged into reactor 64 (FIG. 2), and the temperature is raised to about 50° C. Then, 28 liters of sulfuric acid are slowly introduced under stirring. Stirring is maintained at a temperature of 60° to 75° C. during 12 hours. After cooling, 45 liters of water are slowly added into the reactor under stirring. The sulfonated phenol thus obtained in reactor 64 is transferred into the mixer 76. The cross-linking agent obtained is then transferred into the storage tank 80.

The nature and the properties of the foam depend on the ratio between the cross-linking agents a) and b).

c) It is also possible to introduce into the mixture of cross-linking agents a) and b) a further cross-linking agent c) of the type of sulfonated cyclic phenolic oligomers, for example belonging to the class of calixarene sulfonic acids such as the calix[6]arene p-sulfonic acid. These compounds that have never been proposed as resol cross-linking agents yet, are for example described in the article "Synthesis and acid-base properties of calix[4], calix[6] and calix[8]arene p-sulfonic acids" by J. P. Scharff, M. Mahjoubi and R. Perrin, *New J. Chem.* 1991, 15, 883–887.

A preferred, combined cross-linking agent contains 2 to 4 parts of cross-linking agent a) for 1 part of cross-linking agent b). Another preferred cross-linking mixture contains from 55 to 70% of sulfonated linear phenolic oligomers a), from 20 to 30% of sulfonated phenol at about 60% (dissolved in water), and from 10 to 15% of calix[6]arene p-sulfonic acid. These percentages refer to the weight.

C) Foam manufacture

Into the mixer 88 (FIG. 3A) are continuously introduced the following amounts per minute: 7.8 kg of resol (containing 0.15 kg of surface active agent), 1.2 kg of a cross-linking mixture, and 0.8 kg of blowing agent. These four components are intimately blended. The mixture is poured through the pouring head 90 onto the moving belt 94. The poured mass expands in a few seconds and forms a string being about 60 cm wide and 30 cm thick. The cooled string is continuously fed into the shredder 104 where it is broken up into flakes that are then collected in the storing chamber 116.

EXAMPLE 2

The following mixture (in parts by weight) is introduced into the mixer of the foam manufacturing unit:

800 parts of resol containing 16 parts of surface active agent, 150 parts of cross-linking agent (a mixture of cross-linking agents a), b) and c) in a weight ratio of 62:24:13), and 80 parts of blowing agent. A foam is formed comprising fine cells.

EXAMPLE 3

The following mixture (in parts by weight) is introduced into the mixer of the foam manufacturing unit:

800 parts of resol containing 16 parts of surface active agent, 150 parts of cross-linking agent (a mixture of cross-linking agents a) and b) in a weight ratio of about 75:25), and 80 parts of blowing agent. A smooth foam is formed comprising fine cells.

The foam thus obtained is used alike other anti-pollution products: It is spread on the pollution site, and it rapidly absorbs the polluting substances. Then, the foam that was floating, thanks to its hydrophobicity, at the surface of the aqueous medium where it has been applied, continues to float and may be recovered by conventional means which are typically used. It has been found that the foam of the invention can not only be manufactured at a relatively low price but shows on the other hand an extraordinary absorbing power; it has been found in fact during experiments that it absorbs up to 72 times its weight of lipophilic materials.

The use of the foam is not limited to its application on aqueous media. The foam of the invention may also be used for cleaning purposes and sewage purification in industry and most specially on the floors. The foam may thus be transformed into different forms such as a spreadable powder. Numerous other uses and applications are possible.

Still another application of the foam according to the invention is in the field of hygienic and health service. This application comprises the cleaning, the filtration and the absorption in the field of common life such as the recovery of frying oil, in filters of ventilator hoods, in scrubbing powders as well in absorbing terry-towels for repeated use.

For the manufacture of a phenolic plastic in the form of an absorbing foam, a resol, a cross-linking agent as defined above, a surface active agent and optionally a coloring agent are used according to the invention, and it goes without saying that these constituents represent the is minimum for obtaining a desired foam. Thus, it is possible to use several resols, mixtures of cross-linking agents, of surface active agents, of blowing agents, etc., or still add, if required or desired, other additives such as antioxidants, additives having an effect on the manufacturing process or the properties of the foam to be produced, and anti-UV compounds influencing the behavior of the foam in the light.

We claim:

1. Cellular foam on the base of a phenol-formol resin, characterized in that it is constituted of a phenol formol resol cross-linked by means of a cross-linking agent selected from completely or partially sulfonated linear and cyclic phenolic oligomers, optionally containing sulfonated phenol, the foam containing a surface active agent and optionally a stabilizer, and in that the foam has a hydrophobic nature permitting its use for absorbing, retaining and transporting oleophilic fatty liquids.

2. The foam of claim 1, characterized in that it further contains a coloring agent.

3. The foam of claim 1, characterized in that it is in the form of flakes having a density of from 7 to 9 $kg/m^3$.

4. The foam of claim 1, characterized by an absorption power for hydrocarbons, animal and vegetable fats and other hydrophobic pollutants up to 72 times its weight.

5. The foam of claim 1, characterized in that it is cross-linked by a cross-linking agent which is a mixture of completely or partially sulfonated linear phenolic oligomers and of completely or totally sulfonated phenol.

6. The foam of claim 1, characterized in that it is cross-linked by a cross-linking agent which is a mixture of completely or partially sulfonated linear and cyclic phenolic oligomers.

7. The foam of claim 1, characterized in that the surface active agent is an organic compound having a HLB value of $\geq 10$.

8. A process for the manufacture of the foam according to claim 1, characterized in that a foamable mixture is prepared starting from (A) a resol, (B) a cross-linking agent selected from completely or partially sulfonated linear and cyclic phenolic oligomers, optionally further containing sulfonated phenol, (C) a surface active agent, and (D) a blowing agent, and the mixture is poured on a support for effecting the formation and the solidification of the foam.

9. The process of claim 8, characterized in that a coloring agent, preferably an azoic, phenolic or calixarenic coloring agent, is added to the mixture of components (A) to (D).

10. The process of claim 8, characterized in that the cross-linking agent (B) is a mixture of completely or partially sulfonated linear phenolic oligomers and of completely or totally sulfonated phenol.

11. The process of claim 8 or 9, characterized in that the cross-linking agent (B) is a mixture of completely or partially sulfonated linear and cyclic phenolic oligomers.

12. The process of claim 8, characterized in that the surface active agent (C) is an organic compound having a HLB value of $\geq 10$.

\* \* \* \* \*